(12) United States Patent
Seo et al.

(10) Patent No.: US 11,680,129 B2
(45) Date of Patent: Jun. 20, 2023

(54) UV-CURABLE RESIN COMPOSITION FOR VACUUM FORMING AND REPLICA FILM OF REAL MATERIAL COMPRISING THE SAME

(71) Applicants: Hyundai Motor Company, Seoul (KR); Kia Motors Corporation, Seoul (KR); SKC hi-tech & marketing Co., Ltd., Chungcheongnam-do (KR)

(72) Inventors: Jae Sik Seo, Gyeonggi-do (KR); Hyun Jung Kim, Seoul (KR); Hyun Kyung Kwon, Incheon (KR); Seong Do Kim, Gyeonggi-do (KR); Chang Ho Kang, Chungcheongnam-do (KR)

(73) Assignees: Hyundai Motor Company, Seoul (KR); Kia Motors Corporation, Seoul (KR); SKC Hi-Tech & Marketing Co., Ltd., Cheonan (KR)

( * ) Notice: Subject to any disclaimer, the term of this patent is extended or adjusted under 35 U.S.C. 154(b) by 227 days.

(21) Appl. No.: 17/107,870

(22) Filed: Nov. 30, 2020

(65) Prior Publication Data
US 2021/0388146 A1    Dec. 16, 2021

(30) Foreign Application Priority Data
Jun. 10, 2020 (KR) .......... 10-2020-0070007

(51) Int. Cl.
*C08G 18/10* (2006.01)
*B29C 35/08* (2006.01)
(Continued)

(52) U.S. Cl.
CPC .......... *C08G 18/10* (2013.01); *B29C 35/0805* (2013.01); *B32B 27/08* (2013.01); *B32B 27/16* (2013.01); *B32B 27/18* (2013.01); *B32B 27/308* (2013.01); *B32B 27/40* (2013.01); *C08L 33/14* (2013.01); *C08L 75/04* (2013.01); *B29C 2035/0827* (2013.01); *B32B 2307/306* (2013.01); *B32B 2367/00* (2013.01); *B32B 2375/00* (2013.01); *B32B 2605/006* (2013.01)

(58) Field of Classification Search
CPC combination set(s) only.
See application file for complete search history.

(56) References Cited

U.S. PATENT DOCUMENTS

| | | | |
|---|---|---|---|
| 6,399,193 B1 * | 6/2002 | Ellison | .......... B32B 27/08 428/41.2 |
| 2004/0152799 A1 | 8/2004 | Miller et al. | |

(Continued)

FOREIGN PATENT DOCUMENTS

| | | | | |
|---|---|---|---|---|
| EP | 247563 A2 * | 12/1987 | .......... | C08F 299/06 |
| JP | 2009209511 A * | 9/2009 | .......... | B41J 2/2114 |

(Continued)

OTHER PUBLICATIONS

Machine translation of JP 2009-209511 A (Year: 2009).*

*Primary Examiner* — Ramsey Zacharia
(74) *Attorney, Agent, or Firm* — Fox Rothschild LLP (57) ABSTRACT

Disclosed are a UV-curable resin composition for vacuum forming and a replica film of a real material including the same. The UV-curable resin composition includes a prepolymer including a urethane-containing oligomer, an acrylate monomer and a photoinitiator.

15 Claims, 5 Drawing Sheets

(51) Int. Cl.
  *B32B 27/08* (2006.01)
  *B32B 27/16* (2006.01)
  *B32B 27/18* (2006.01)
  *B32B 27/30* (2006.01)
  *C08L 75/04* (2006.01)
  *C08L 33/14* (2006.01)
  *B32B 27/40* (2006.01)

(56) References Cited

U.S. PATENT DOCUMENTS

2006/0142502 A1* 6/2006 Bischof ................ C09D 175/16
  525/330.3
2009/0197000 A1  8/2009 Limerkens et al.
2012/0129972 A1  5/2012 Hall et al.

FOREIGN PATENT DOCUMENTS

| KR | 2014-0083593 A | 7/2014 |
| KR | 2018-0132374 A | 12/2018 |
| WO | 2019234560 A1 | 12/2019 |

* cited by examiner

UV-CURABLE RESIN COMPOSITION FOR VACUUM FORMING AND REPLICA FILM OF REAL MATERIAL COMPRISING THE SAME

CROSS-REFERENCE TO RELATED APPLICATION

This application claims under 35 U.S.C. § 119(a) the benefit of priority to Korean Patent Application No. 10-2020-0070007 filed on Jun. 10, 2020, the entire contents of which are incorporated herein by reference.

TECHNICAL FIELD

The present invention relates to a UV-curable resin composition for vacuum forming and a replica film of a real material containing the same.

BACKGROUND

Interior and exterior materials utilizing ultra-high-priced real woven carbon fabrics are typically applied, especially to high-performance vehicles, to upgrade the interior and exterior materials of vehicles. However, real carbon materials are highly expensive and require a complicated processing in order to produce into parts.

Therefore, various attempts have been made to simulate real carbon, such as injection-molding a film having a shape similar to the surface pattern of real carbon into a mold, conducting surface coating thereon, and applying the result to parts.

These methods have an advantage of cost reduction, but a limitation of significantly deteriorated appearance. In particular, conventional simulation methods are technically limited in that the line width of real carbon as well as the unique three-dimensional texture and gloss of carbon cannot be realized.

In order to overcome these disadvantages and limitations, attempts have been made to combine the simulation methods with UV imprinting, but automotive parts having a complicated shape, rather than a flat shape, cannot be formed due to the nature of a light UV resin layer.

The above information disclosed in this Background section is only for enhancement of understanding of the background of the invention and therefore it may contain information that does not form the prior art that is already known in this country to a person of ordinary skill in the art.

SUMMARY

In preferred aspects, provided are a replica film that may have a real material to realize the unique characteristics thereof, and a UV-curable resin composition forming the same. Further, provided is a replica film which can be applied to vehicle parts having a complicated shape rather than a flat surface due to excellent moldability and a UV-curable resin composition contained therein.

The objects of the present invention are not limited to those described above. The objects of the present invention will be clearly understood from the following description and can be implemented by the means defined in the claims and combinations thereof.

In one aspect, the present invention provides a UV-curable resin composition including a prepolymer including a urethane-containing oligomer, an acrylate monomer and a photoinitiator.

A term "UV-curable resin" or "UV-polymerizable resin" as used herein refers to a polymer material that are polymerized, hardened, and cured by the ultraviolet (UV) light within a wavelength of 10 nm to 400 nm, or by energy radiated from UV light irradiation devices. A term "prepolymer" or "polymer precursor" as used herein refers to a mixture of unreacted or uncured monomers, which is further polymerized via reactive groups in the monomers.

A term "urethane-containing oligomer" or "polyurethane" as used herein refers to a polymer formed by linking organic groups (e.g., epoxy, unsaturated esters, and phenolic groups) linked with carbamate (—NH—(C=O)—O—). The carbamate linkage of the urethane-containing oligomer may be preferably formed by reacting isocyanate group (—N=C=O) and polyol having multiple hydroxyl groups.

A term "acrylate monomer" refers to a monomer including one or more of (—$CH_2$=CHCOO—) group, which may be susceptible to polymerization via vinyl group and provides the carboxylate functionality.

A term "photoinitiator" as used herein refers to a molecule that can generate reactive species (e.g., free radicals, cations or anions) upon UV or visible light radiation. The photoinitiator initiates a UV-curing or UV polymerizing as being included in the UV-curable resin composition.

The urethane-containing oligomer may be obtained or obtainable by reacting isocyanate including one or more selected from the group consisting of toluene diisocyanate (TDI), naphthalene-1,5-diisocyanate, p-phenylene diisocyanate, tolidine diisocyanate, 4,4'-diphenyl methane diisocyanate, 4,4'-methylene dicyclohexyl diisocyanate, 4,4'-methylene dicyclohexyl diisocyanate, hexamethylene diisocyanate, hexamethylene diisocyanate, dicyclohexylmethane diisocyanate and isophorone diisocyanate, a polyol including one or more selected from the group consisting of polyether polyol, polyester polyol, polycarbonate polyol and acryl polyol, and a reactive monomer.

The reactive monomer may suitably include one or more selected from the group consisting of 2-hydroxyethyl acrylate, 4-hydroxybutyl acrylate, 2-hydroxyethyl methacrylate, 2-hydroxypropyl acrylate and pentaerythritol triacrylate.

The urethane-containing oligomer may suitably have a weight average molecular weight of about 2,000 g/mol to 5,000 g/mol.

The acrylate monomer may suitably include one or more selected from the group consisting of isobornyl acrylate, 2-hydroxypropyl acrylate and hydroxyl pivalic acid neopentyl glycol diacrylate.

The acrylate monomer may suitably include isobornyl acrylate, 2-hydroxypropyl acrylate, and hydroxyl pivalic acid neopentyl glycol diacrylate.

The photoinitiator may include one or more selected from the group consisting of a short-wavelength photoinitiator and a long-wavelength photoinitiator.

Preferably, the short-wavelength photoinitiator may include 1-hydroxy cyclohexyl phenyl ketone and the long-wavelength photoinitiator may include diphenyl(2,4,6-trimethylbenzoyl)phosphine oxide (TPO).

The UV-curable resin composition may further include an additive selected from UV stabilizers, heat-resistant stabilizers and combinations thereof.

The prepolymer may be present in an amount of about 20 to 50% by weight, based on the total weight of the UV-curable resin composition.

The acrylate monomer may include an amount of about 15 to 30% by weight of isobornyl acrylate, an amount of about 15 to 30% by weight of 2-hydroxypropyl acrylate and an amount of about 1 to 10% by weight of hydroxyl pivalate neopentyl glycol diacrylate, based on the total weight of the UV-curable resin composition.

The photoinitiator may include an amount of about 1% by weight to 5% by weight of a short-wavelength photoinitiator and an amount of about 0.5% by weight to 1% by weight of a long-wavelength photoinitiator, based on the total weight of the UV-curable resin composition.

In another aspect, provided is a replica film having a texture of a real material (e.g., carbon material) including a base layer; and a resin layer provided on the base layer, including a first surface adjacent to the base layer and a second surface facing the first surface and including the UV-curable composition according to the present invention.

The resin layer may preferably include a surface pattern, e.g., having the same or similar pattern of three-dimensional texture of carbon material.

The replica film may have bendability corresponding to a curvature radius of about 1 mm to 10 mm and an elongation of about 200% or greater.

In another aspect, the present invention provides a method of producing a replica film. The method may include forming a resin layer including the UV-curable resin composition as described herein on a base layer, forming a surface pattern on a surface of the resin layer and forming a laminate including the resin layer and the base layer.

A term "laminate" as used herein refers to a substance that includes two or more layers, and the layers may be the same or different to each other. Preferably, the laminate includes at least the base layer and the resin layer.

The resin layer may suitably have a thickness of about 100 to 250 μm.

The laminate may be formed by applying vacuum at a temperature of about 130 to 150° C.

The replica film may have bendability corresponding to a curvature radius of about 1 mm to 10 mm and an elongation of about 200% or greater.

Further provided is a vehicle part including the replica film described herein.

Other aspects of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

DETAILED DESCRIPTION

The objects described above, as well as other objects, features and advantages, will be clearly understood from the following preferred embodiments with reference to the attached drawings. However, the present invention is not limited to the embodiments and may be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the term "comprises" or "has", when used in this specification, specifies the presence of stated features, numbers, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, in all cases, the term "about" should be understood to modify all such numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous and include all numbers from the minimum to the maximum including the maximum within the ranges unless otherwise defined. Furthermore, when the range refers to an integer, it includes all integers from the minimum to the maximum including the maximum within the range, unless otherwise defined.

Hereinafter, a replica film of a real material according to the present invention will be described in detail.

Figure 1:
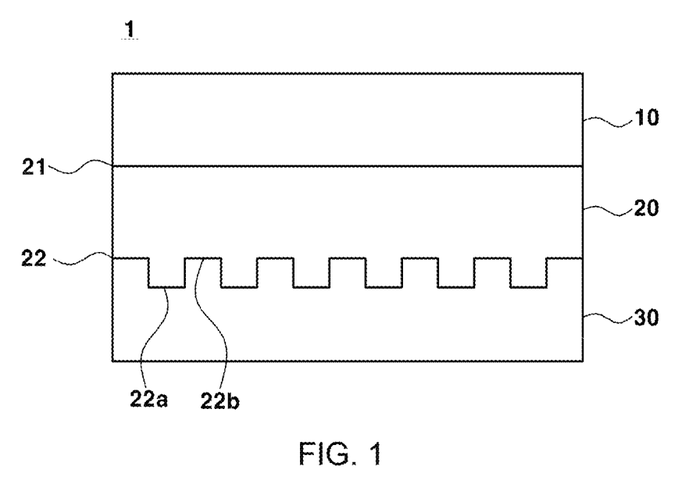
FIG. 1 shows a cross-sectional view schematically showing an exemplary replica film of a real material according to an exemplary embodiment of the present invention.

FIG. 1 shows a cross-sectional view schematically showing an exemplary replica film 1 of an exemplary real material according to an exemplary embodiment of the present invention. As shown in FIG. 1, the replica film 1 may include a base layer 10, a resin layer 20 provided on the base layer 10 and including a first surface 21 adjacent to the base layer 10 and a second surface 22 facing the first surface 21, and a printing layer 30 provided on the resin layer 20.

Any material may be used as the real material without particular limitation, as long as it has a unique surface texture. For example, the real material may be selected from the group consisting of real carbon, real wood, natural cork, real stone, thin-film metal, Korean traditional paper, and combinations thereof. Preferably, the real material may be real carbon material. According to the present invention, it is possible to obtain a replica film in which the same surface pattern as the surface pattern of the real material is exposed to the outside.

The base layer 10 may include a transparent material. For example, the material for the base layer 10 may be selected from the group consisting of polycarbonate (PC), polymethyl methacrylate (PMMA), polyethylene terephthalate (PET) and combinations thereof, but is not limited thereto.

The base layer 10 may have a thickness of about 0.3 mm to 0.5 mm. When the thickness is less than about 0.3 mm, the depth continuity of the replica film 1 may not be realized, and when the thickness is greater than about 0.5 mm, formability (moldability) may be deteriorated.

The resin layer 20 may include a second surface 22 having the same surface pattern as the surface pattern of the real material. Although the surface pattern of the second surface 22 is shown as a structure of irregularities in FIG. 1, the surface pattern is not limited thereto, and should be interpreted to be the same as the surface pattern of the selected real material as desired.

The surface pattern of the second surface 22 may include a plurality of depressions 22a and a plurality of protrusions 22b. Each of the depressions 22a may be embedded to a depth of about 100 μm to 250 μm from the second surface 22. The criterion for measuring the depth of the depression 22a may be a flat surface of the protrusion 22b of the second surface 22. When the thickness is less than about 100 μm, the three-dimensional effect may be unsatisfactory, and when the thickness is greater than about 250 μm, formability (moldability) may be deteriorated and concealment from the printed layer 40 may be deteriorated.

In the surface pattern of the second surface 22, the depressions 22a and the protrusions 22b may repeatedly cross each other. However, the interval between a corresponding depression and protrusion may be regular or irregular. In addition, the depression 22a may be embedded at a right angle or at an approximately right angle relative to the protrusion 22b, as shown in FIG. 1, or may be embedded to be inclined at a predetermined angle.

The resin layer 20 may include a UV-curable resin composition so as to improve the break load and elongation of the resin layer 20 using a UV-curable resin composition having a specific composition and content. Accordingly, the replica film 1 may be formed to have a curvature radius of about 1 mm or greater, or a bendability of about 1 mm to 10 mm, and an elongation of about 200% or greater. Preferably, a replica film 1 that can also be applied to vehicle parts having a complicated shape may be obtained.

The printing layer 30 may be a component which is provided on the resin layer 20 to impart the overall color to the replica film 1 and protect the resin layer 20.

The printing layer 30 may be formed by printing an ink selected from the group consisting of a urethane-containing ink, a polyvinyl-chloride-containing ink, and combinations thereof at a predetermined frequency on the resin layer 20, but is not limited thereto.

The ink may be a one-liquid- or two-liquid-type ink. For example, for a two-liquid-type ink, the curing agent may be an isocyanate-containing curing agent such as HDI, MDI, TDI or IPDI, and the content thereof may be an amount of about 10% to 20% by weight based on the total weight of the ink composition. When the content of the curing agent is less than about 10% by weight, the physical properties of the print layer 30 may be deteriorated and the ink may wash out, and when the content is greater than about 20% by weight, printability may be deteriorated.

In forming the printing layer 30, the frequency is not particularly limited, but is preferably 4 or greater. When printing is conducting at a frequency of less than about 4, ink may wash out when the replica film 1 is applied to automobile parts.

Hereinafter, the UV-curable resin composition according to the present invention will be described in detail.

The UV-curable resin composition may include a prepolymer (A) including a urethane-containing oligomer, an acrylate monomer (B) and a photoinitiator (C).

The prepolymer may include a polymer having a relatively low molecular weight that is obtained to have an intermediate polymerization degree so as to be easily molded when manufacturing a final molded article. The prepolymer can be molded without any treatment or after reacting with another polymerizable compound, and may be prepared by, for example, reacting with an isocyanate compound, a polyol, or the like.

The urethane-containing oligomer may include an acrylate end group. For example, the urethane-containing oligomer may include an aliphatic urethane acrylate having two or more functional groups.

The urethane-containing oligomer may be a component for improving yellowing resistance, adhesion to a substrate and elongation. The urethane-containing oligomer may be obtained by reacting a polymer of isocyanate and polyol with a reactive monomer.

The isocyanate may suitably include one or more selected from the group consisting of toluene diisocyanate (TDI), naphthalene-1,5-diisocyanate, p-phenylene diisocyanate, tolidine diisocyanate, 4,4'-diphenyl methane diisocyanate, 4,4'-methylene dicyclohexyl diisocyanate, 4,4'-methylene dicyclohexyl diisocyanate, hexamethylene diisocyanate, hexamethylene diisocyanate, dicyclohexylmethane diisocyanate, and isophorone diisocyanate.

The polyol is not particularly limited, and for example, may include one or more selected from the group consisting of polyether polyol, polyester polyol, polycarbonate polyol, and acryl polyol, and may include a polyester polyol.

The reactive monomer may include crosslinkable monomer, and free radicals generated by a photoinitiator cause crosslink-polymerization of the double bonds in the reactive monomer, thereby performing curing. The reactive monomer may include one or more selected from the group consisting of 2-hydroxyethyl acrylate, 4-hydroxybutyl acrylate, 2-hydroxyethyl methacrylate, 2-hydroxypropyl acrylate and pentaerythritol triacrylate.

The urethane-containing oligomer may have a weight average molecular weight of about 2,000 g/mol to 5,000 g/mol, or about 3,000 g/mol to 4,000 g/mol.

The urethane-containing oligomer is, for example, obtained or obtainable by reacting a polymer of polyester polyol and 4,4'-methylene dicyclohexyl diisocyanate, as an isocyanate, with 2-hydroxyethyl acrylate, as a reactive monomer, and has a weight average molecular weight of about 3,000 g/mol.

The content of the prepolymer may be about 20 to 50% by weight. When the content of the prepolymer is less than about 20% by weight, elongation of the resin layer and adhesion to the substrate may be deteriorated, and when the content is greater than about 50% by weight, curability may be deficient, releasability may be deteriorated, and coating performance may be deteriorated due to the increased viscosity thereof.

The acrylate monomer (B) may improve the physical properties of the resin layer and cause curing through crosslinking polymerization between double bonds in the acrylate monomer using free radicals generated by the photoinitiator.

The acrylate monomer (B) may include one or more selected from the group consisting of isobornyl acrylate, 2-hydroxypropyl acrylate, and hydroxyl pivalic acid neopentyl glycol diacrylate.

Preferably, the acrylate monomer (B) may include appropriate amounts of isobornyl acrylate, 2-hydroxypropyl acrylate, and hydroxyl pivalic acid neopentyl glycol diacrylate.

Preferably, the acrylate monomer (B) may include an amount of about 15 to 30% by weight of the isobornyl acrylate, an amount of about 15 to 30% by weight of the 2-hydroxypropyl acrylate and an amount of about 1 to 10% by weight of the hydroxyl pivalic acid neopentyl glycol diacrylate, based on 100% by weight of the UV-curable resin composition.

When the content of the isobornyl acrylate is less than about 15% by weight, adhesion to the substrate may be deteriorated and chemical resistance may be insufficient. On the other hand, when the content is greater than about 30% by weight, curability may be deteriorated and unreacted residue may remain.

When the content of the 2-hydroxypropyl acrylate is less than about 15% by weight, the pattern may not be maintained due to poor bendability (flexibility), and the appearance may be deteriorated due to, for example, peeling.

When the content of the hydroxyl pivalate neopentyl glycol diacrylate is greater than about 10% by weight, elongation may be deteriorated.

The photoinitiator (C) may absorb ultraviolet light and thus is photo-degraded to produce free radicals. The free radicals may crosslink-polymerize the double bonds of the prepolymer, the acrylate monomer and the like, thus causing curing.

The photoinitiator (C) may include one or more selected from the group consisting of a short-wavelength photoinitiator and a long-wavelength photoinitiator, and preferably a combination of a short-wavelength photoinitiator and a long-wavelength photoinitiator.

The short-wavelength photoinitiator may include 1-hydroxy cyclohexyl phenyl ketone or the like.

The content of the short-wavelength photoinitiator may be an amount of about 1% by weight to 5% by weight based on the total weight of the UV-curable resin composition. When the content is less than about 1% by weight, the surface may not be cured, and when the content is greater than about 5% by weight, excessive curing may occur.

The long-wavelength photoinitiator may include diphenyl (2,4,6-trimethylbenzoyl)phosphine oxide (TPO) or the like.

The content of the long-wavelength photoinitiator may be an amount of about 0.5% to 1% by weight based on the total weight of the UV-curable resin composition. When the content is less than about 0.5% by weight, curing may not be sufficient, and when the content is greater than about 1% by weight, the potential for yellowing is high.

The UV-curable resin composition may further include an additive selected from the group consisting of ultraviolet stabilizers, heat stabilizers, dispersants, matting agents, antifoaming agents and combinations thereof.

Hereinafter, a method of producing a replica film of a real material using the UV-curable resin composition will be described in detail.

Figure 2:
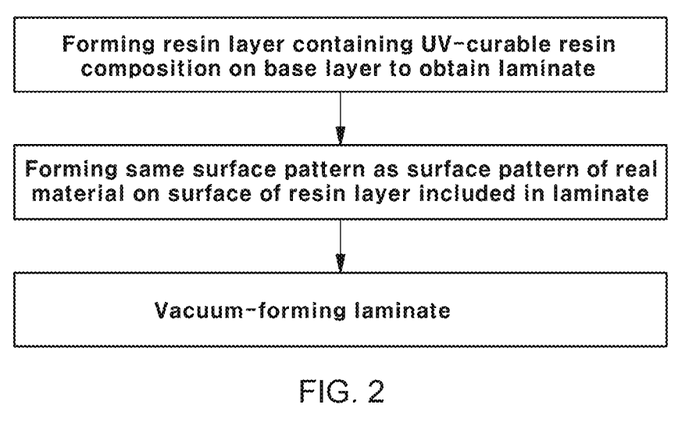
FIG. 2 shows a flowchart showing an exemplary method of producing an exemplary replica film having a texture of a real material according to an exemplary embodiment of the present invention.

FIG. 2 shows a flowchart schematically illustrating an exemplary method of producing an exemplary replica film according to an exemplary embodiment of the present invention. As shown in FIG. 2, the method of producing a replica film of a real material may include forming a resin layer including the UV-curable resin composition on a base layer (S10), forming a surface pattern on a second surface of the resin layer (S20), and forming a laminate including the resin layer (S30).

The method of forming the surface pattern is not particularly limited and may be formed by, for example, imprinting or the like.

The method may further emitting ultraviolet light to the resin layer after forming the surface pattern.

The vacuum forming is a method of forming the film by pressing the heat-softened film using a mold or frame to realize a desired shape and vacuum-sucking the air between the film and the mold or frame. The method of vacuum forming is not particularly limited, and may be performed using an appropriate device.

The forming the laminate by applying vacuum may be carried out by vacuum-molding the laminate by heating the surface temperature of the laminate to a temperature of about 130 to 150° C.

When the conditions of the vacuum forming are the same as above and the above-mentioned UV-curable resin composition is used, it is possible to prevent wrinkling of the resin layer or breakage of curved parts. Specifically, the laminate can secure a curvature radius of about 0.5 mm or greater or a bendability of about 0.5 mm to 10 mm, and an elongation of about 200% or greater.

EXAMPLE

Hereinafter, the present invention will be described in more detail with reference to specific examples. However, the following examples are provided only for illustration of the present invention, and should not be construed as limiting the scope of the present invention.

Examples, Comparative Examples 1 to 4

A UV-curable resin composition was prepared in accordance with the composition and content shown in Table 1 below, and was UV-imprinted to form a resin layer. For reference, the values in Table 1 are expressed in wt %.

TABLE 1

| | Composition | Comparative Example 1 | Comparative Example 2 | Comparative Example 3 | Comparative Example 4 | Example |
|---|---|---|---|---|---|---|
| Prepolymer | Urethane-containing oligomer (A)[1)] | 24~33 | 27~37 | 20~39 | 15~25 | 20~50 |
| | Urethane-containing oligomer (A')[2)] | 5~15 | 5~15 | 3~12 | 10~20 | — |
| | Acrylic oligomer (A'')[3)] | 1~5 | 1~5 | 1~3 | 10~20 | — |

TABLE 1-continued

| | Composition | Comparative Example 1 | Comparative Example 2 | Comparative Example 3 | Comparative Example 4 | Example |
|---|---|---|---|---|---|---|
| Acrylate monomer | Tetrahydrofurfuryl acrylate | 18~28 | 17~27 | 19~29 | 15~25 | — |
| | Isobornyl acrylate | 14~24 | 13~23 | 14~26 | 12~22 | 15~30 |
| | 2-Hydroxypropyl acrylate | — | — | 1~14 | — | 15~30 |
| | Hydroxyl pivalic acid neopentyl glycol diacrylate | — | 5~15 | 1~3 | 3~13 | 1~10 |
| Photoinitiator | Short-wavelength photoinitiator [4] | <1 | <1 | <1 | <1 | <1 |
| | Long-wavelength photoinitiator [5] | <1 | <1 | <1 | <1 | <1 |
| Additive | UV stabilizer [6] | <3 | <3 | <3 | <3 | <3 |
| | Heat stabilizer [7] | <3 | <3 | <3 | <3 | <3 |

[1] A product obtained by reacting a polymer of 4,4'-methylene dicyclohexyl diisocyanate and polyester polyol with 2-hydroxyethyl acrylate was used. The weight average molecular weight thereof was about 3,000 g/mol.
[2] A product obtained by reacting a polymer of 2,4,6-trioxotriazine-1,3,5-triyl)tris(hexamethylene) isocyanate and polyester polyol with pentaerythritol triacrylate was used. The weight average molecular weight thereof was about 2,000 g/mol.
[3] An acrylic acrylate having a weight average molecular weight of about 50,000 g/mol was used.
[4] 1-hydroxy cyclohexyl phenyl ketone
[5] Diphenyl(2,4,6-trimethylbenzoyl)phosphine oxide
[6] Irganox ® 1010
[7] TINUVIN ® 292

The vacuum formability, elongation, breaking load, releasability and viscosity of the resin layers according to Examples and Comparative Examples 1 to 4 were measured.

The vacuum formability was evaluated by visually observing whether or not a replica film having a desired shape (an outer radius of curvature of 2.5 mm and an inner radius of curvature of 1 mm, and elongation in a depth direction of about 210%) was produced after forming the resin layer on a base layer (PC/PMMA) to which an imprinting resin is applied, heating the resin layer at a heater temperature of 320° C. and a distance of 80 mm for about 30 seconds, and then applying a vacuum thereto.

Elongation and breaking load were measured in accordance with ASTM D 882, and specifically, the elongation and breaking of a specimen having a size of 15 mm×125 mm were evaluated at a rate of 200 mm/min at a temperature of 130° C.

The viscosity was measured under the conditions of 60 RPM and at a temperature of 25° C. for 30 seconds using a Viscometer, and a viscosity of 300 cps or less was considered excellent (O).

The releasability was measured on a specimen having a size of 25.4 mm×200 mm at a peel strength of 900 mm/min and a measurement section of 150 mm using a peel strength tester, and the case wherein no residue was observed with the naked eye was marked as excellent (O).

The results of evaluation of the vacuum formability of Examples and Comparative Examples 1 to 4 are shown in FIGS. 3A to 3E, and the results of measurement of elongation, breaking load, releasability and viscosity are shown in Table 2 below.

TABLE 2

| Item | Comparative Example 1 | Comparative Example 2 | Comparative Example 3 | Comparative Example 4 | Example |
|---|---|---|---|---|---|
| Elongation [%] | 72 | 69 | 99 | 103 | 200 or more |
| Breaking load [kgf] | 0.158 | 0.156 | 0.154 | 0.193 | 0.036 |
| Releasability [gf] | 175 | 177 | 188 | 149 | 300 or more |
| Viscosity [cps] | 161 | 206 | 233 | 250 | 389 |

Figure 3A:
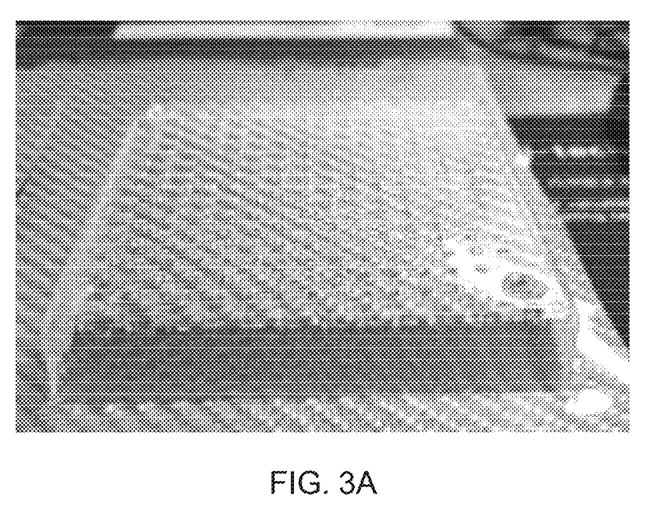
FIG. 3A shows a result of evaluation of vacuum formability of the UV-curable resin composition of Examples according to an exemplary embodiment of the present invention.
Figure 3B:
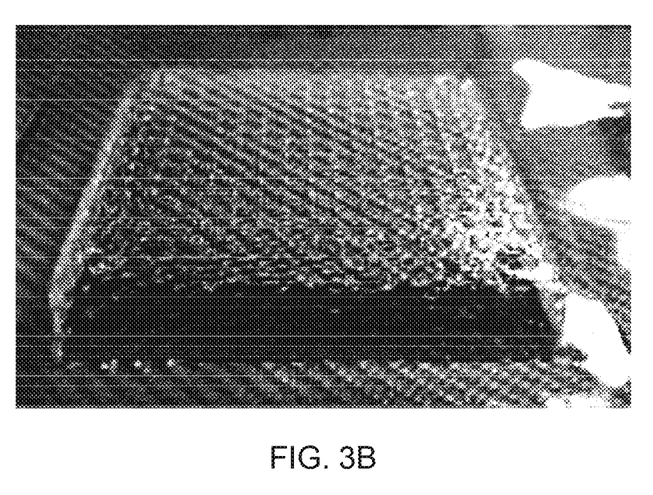
FIGS. 3B to 3E show the results of evaluation of vacuum formability of UV-curable resin compositions of Comparative Examples 1 to 4, respectively.
Figure 3C:
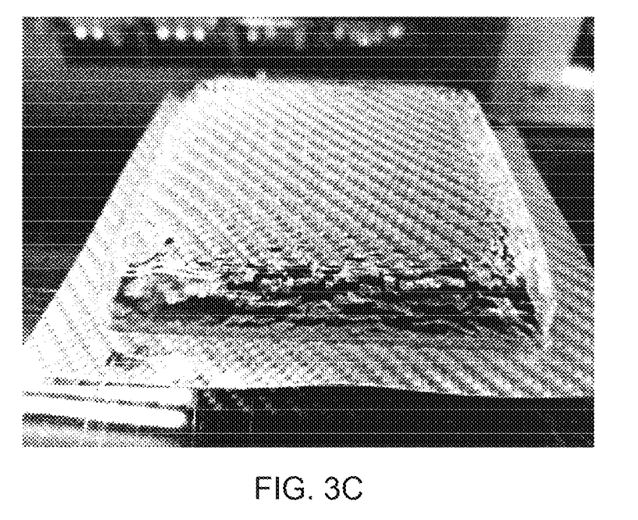
Figure 3D:
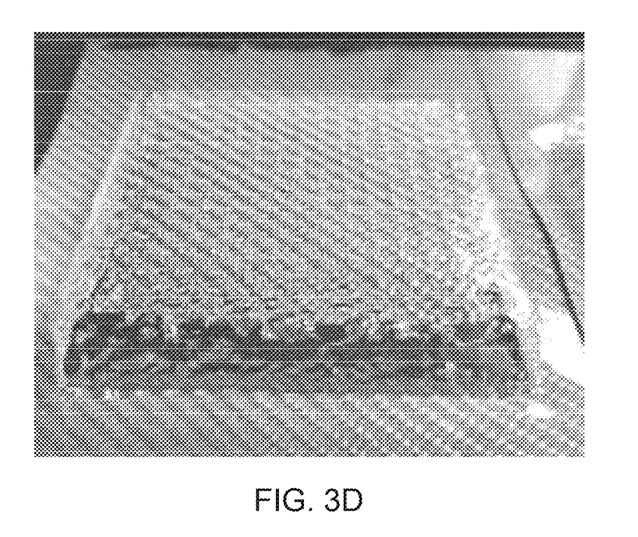
Figure 3E:
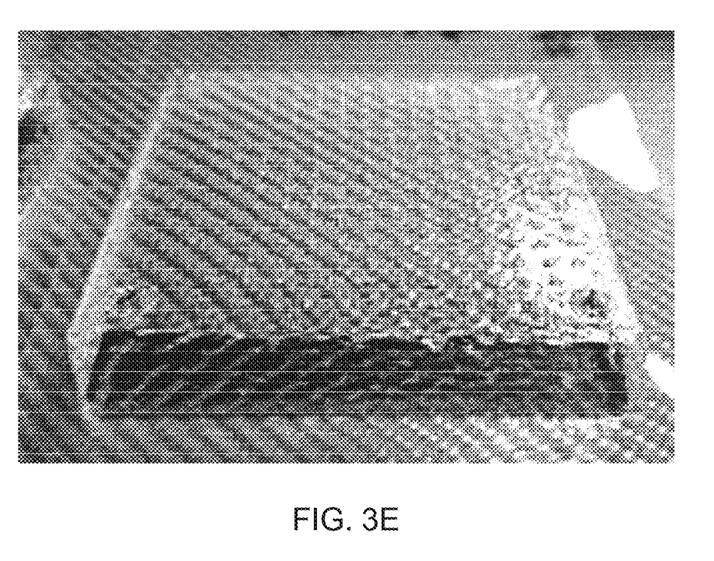

FIG. 3A shows a result of evaluation of the vacuum formability of the replica film according to the Example of the present invention. As shown in FIG. 3A, the pattern was properly maintained without being crushed or damaged in the curved part having a curvature radius of 2.5 mm (outer diameter) and 1 mm (inner diameter). On the other hand, as shown in FIGS. 3B, 3C, 3D, and 3E, which show the results of Comparative Example 1, Comparative Example 2, Comparative Example 3 and Comparative Example 4, the pattern in the curved part was distorted and broken.

In addition, as shown in Table 2, the resin layer of Example above had excellent moldability due to high elongation of 200% or greater and high viscosity, whereas Comparative Examples 1 to 4 had low elongation and viscosity.

According to various exemplary embodiments of the present invention, a replica film may substantially or accurately replicate a real material and thereby realize the unique characteristics thereof. Further provided is a replica film that is applicable to automobile parts having a complicated shape rather than a flat surface, owing to the excellent moldability thereof.

Also provided is a replica film that can be produced at a cost of about 1/10 of a real material while having the same level of appearance thereof, thus conveying excellent price competitiveness.

The effects of the present invention are not limited to those mentioned above. It should be understood that the effects of the present invention include all effects that can be inferred from the description of the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A UV-curable resin composition comprising:
    a prepolymer comprising a urethane-containing oligomer;
    an acrylate monomer; and
    a photoinitiator,
    wherein the photoinitiator comprises a firstphotoinitiator and a second photoinitiator,
    wherein the first photoinitiator comprises 1-hydroxy cyclohexyl phenyl ketone and the second photoinitiator comprises diphenyl(2,4,6-trimethylbenzoyl)phosphine oxide (TPO),
    wherein the prepolymer is present in an amount of about 20 to 50% by weight, the acrylate monomer comprises an amount of about 15 to 30% by weight of isobornyl acrylate, an amount of about 15 to 30% by weight of 2-hydroxypropyl acrylate and an amount of about 1 to 10% by weight of hydroxyl pivalate neopentyl glycol diacrylate, and
    the photoinitiator comprises an amount of about 1% by weight to 5% by weight of the first photoinitiator and an amount of about 0.5% by weight to 1% by weight of the second photoinitiator,
    wherein the weight percentage (% by weight) is based on the total weight of the UV-curable resin composition in each case.

2. The UV-curable resin composition according to claim 1, wherein the urethane-containing oligomer is obtained or obtainable by reacting:
    isocyanate comprising one or more selected from the group consisting of toluene diisocyanate (TDI), naphthalene-1,5-diisocyanate, p-phenylene diisocyanate, tolidine diisocyanate, 4,4'-diphenyl methane diisocyanate, 4,4'-methylene dicyclohexyl diisocyanate, 4,4'-methylene dicyclohexyl diisocyanate, hexamethylene diisocyanate, hexamethylene diisocyanate, dicyclohexylmethane diisocyanate and isophorone diisocyanate;
    a polyol comprising one or more selected from the group consisting of polyether polyol, polyester polyol, polycarbonate polyol and acryl polyol; and
    a reactive monomer.

3. The UV-curable resin composition according to claim 2, wherein the reactive monomer comprises one or more selected from the group consisting of 2-hydroxyethyl acrylate, 4-hydroxybutyl acrylate, 2-hydroxyethyl methacrylate, 2-hydroxypropyl acrylate and pentaerythritol triacrylate.

4. The UV-curable resin composition according to claim 1, wherein the urethane-containing oligomer has a weight average molecular weight of about 2,000 g/mol to 5,000 g/mol.

5. The UV-curable resin composition according to claim 1, wherein the acrylate monomer comprises one or more selected from the group consisting of isobornyl acrylate, 2-hydroxypropyl acrylate and hydroxyl pivalic acid neopentyl glycol diacrylate.

6. The UV-curable resin composition according to claim 1, wherein the acrylate monomer comprises isobornyl acrylate, 2-hydroxypropyl acrylate, and hydroxyl pivalic acid neopentyl glycol diacrylate.

7. The UV-curable resin composition according to claim 1, further comprising an additive selected from UV stabilizers, heat-resistant stabilizers and combinations thereof.

8. A replica film of a real material comprising:
    a base layer;
    a resin layer provided on the base layer, and
    a printing layer provided on the resin layer,
    wherein the resin layer comprises a first surface adjacent to the base layer and a second surface adjacent to the printing layer and comprises the UV-curable composition according to claim 1.

9. The replica film according to claim 8, wherein the resin layer comprises a surface pattern.

10. The replica film according to claim 8, wherein the replica film has bendability corresponding to a curvature radius of about 1 mm to 10 mm and an elongation of about 200% or greater.

11. A vehicle part comprising the replica film according to claim 8.

12. A method of producing a replica film of a real material, comprising:
    forming a resin layer comprising the UV-curable resin composition according to claim 1 on a base layer;
    forming a surface pattern on a surface of the resin layer; and
    forming a laminate of the resin layer.

13. The method according to claim 12, wherein the resin layer has a thickness of about 100 to 250 μm.

14. The method according to claim 12, wherein the laminate is formed by applying vacuum at a temperature of about 130 to 150° C.

15. The method according to claim 12, wherein the replica film has bendability corresponding to a curvature radius of about 1 mm to 10 mm and an elongation of about 200% or greater.

* * * * *